Figure 1:
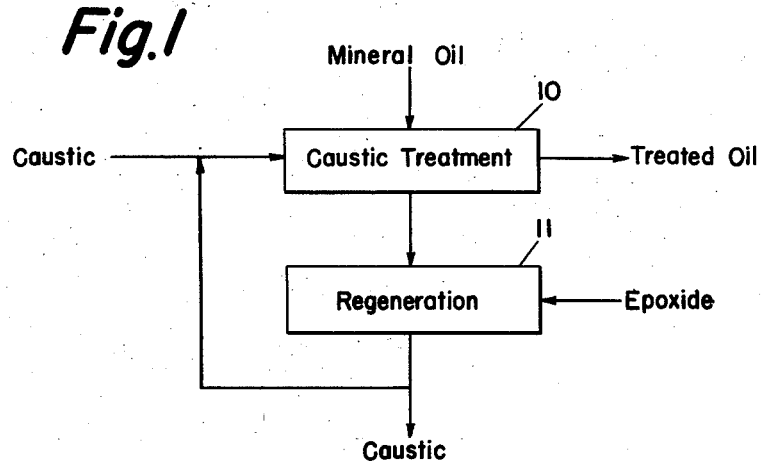

INVENTORS.
JAMES L. JEZL
BY ABRAHAM SCHNEIDER
ATTORNEY

United States Patent Office 2,771,404
Patented Nov. 20, 1956

2,771,404
PETROLEUM REFINING

James L. Jezl, Swarthmore, and Abraham Schneider, Philadelphia, Pa., assignors to Sun Oil Company, Philadelphia, Pa., a corporation of New Jersey Application August 5, 1954, Serial No. 448,110

12 Claims. (Cl. 196—32)

This invention relates to petroleum refining and more particularly to the regeneration of alkaline materials which have been used in such refining.

The regeneration of alkaline treating agents has previously been performed by methods which are disadvantageous for various reasons. Thus, electrolytic regeneration has the disadvantage that alkali metal sulfide contained in the treating agent is converted in part into sodium sulfate and sodium sulfite which neutralize the caustic. Regeneration by steam distillation has the disadvantage that alkali metal sulfide contained in the treating agent remains to a large extent unaffected by the regeneration and builds up in the treating agent. Other disadvantages of prior art regeneration processes tend to make their use unattractive.

The present invention provides a manner of regeneration in which alkali metal sulfides are converted into compounds of an innocuous nature which can be left in the treating agent or allowed without detriment to enter the petroleum material upon further use of the treating agent.

The agent used in regeneration according to the invention is an epoxide. The process of the invention generally involves contact of an alkaline reagent with a petroleum material followed by regeneration of the alkaline reagent by contact with an epoxide reagent.

The reactions involved in the process of the invention may involve mercaptans and other constituents of the petroleum material. Thus, for example, mercaptans, hydrogen sulfide, phenols and/or naphthenic acids, etc. may be involved, and the following reactions may typically occur along the other reactions:

First step:

$$H_2S + 2NaOH \rightarrow Na_2S + 2H_2O$$
$$RSH + NaOH \rightarrow RSNa + H_2O$$
$$R'OH + NaOH \rightarrow R'ONa + H_2O$$
$$R''COOH + NaOH \rightarrow R''COONa + H_2O$$

Second step:

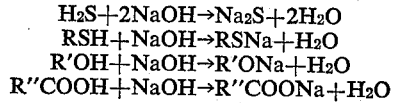

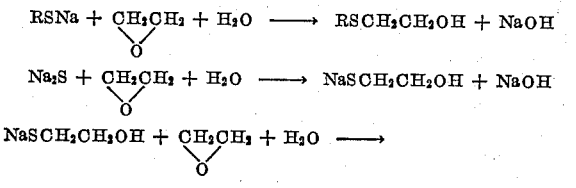

HOCH$_2$CH$_2$SCH$_2$CH$_2$OH + NaOH where RSH is a mercaptan constituent, R'OH a phenol constituent, and R''COOH a naphthenic acid constituent of the petroleum material. Some hydrolysis of epoxide to the corresponding glycol may also occur. The products of the second step may have a beneficial solutizing effect in subsequent re-use of the regenerated treating agent.

It is noted that the above equations represent, in the second step, a selective reaction of ethylene oxide with mercaptides rather than with phenolates and naphthenates.

In the event that sufficient epoxide is used to react with phenolates and naphthenates also, the following are the probable reactions involved:

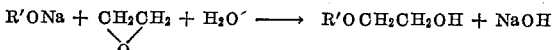

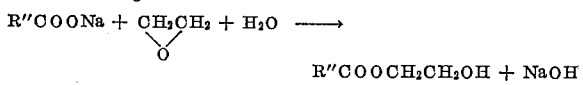

R''COOCH$_2$CH$_2$OH + NaOH

Preferably, however, the latter reactions are minimized, by use of appropriately small amounts of epoxide reagent, and the product of the second step is an alkaline material containing thioethers, phenolates, and naphthenates. This material is a highly effective treating agent for treatment of additional petroleum material.

It is known in the art to refine petroleum materials by contact with an epoxide reagent in the presence of a fresh alkaline catalyst. The treatment according to the invention has important advantages over prior art operation. Treatment according to the invention may, for example, involve treatment of spent caustic soda containing mercaptides, phenolates, and naphthenates with an epoxide to convert the mercaptides to sodium hydroxide and thioethers and contacting the treated caustic with additional oil whereupon sodium hydroxide reacts with additional mercaptan to form mercaptides while the thioethers in the caustic are in part extracted therefrom by the oil. In prior art operation, fresh caustic is contacted simultaneously with epoxide and oil, presumably with resultant formation of ethers with phenols, esters with naphthenic acids, and thioethers with mercaptans; the resulting caustic soda contains substantially less phenolates and naphthenates than can be obtained according to the invention, wherein spent caustic can be first obtained under circumstances promoting formation of phenolates and naphthenates and then contacted with epoxide under circumstances favoring the retention of phenolates and naphthenates in the caustic. Because of the high phenolate and naphthenate content of regenerated caustic obtainable according to the invention, the regenerated caustic has high solvent power for mercaptides so that the latter are drawn into the caustic while thioethers are drawn into the oil.

The process of the invention may be applied to alkaline materials which have been used to refine various petroleum materials. Thus, crude oil, reduced crude, kerosene, spirits, gasoline, gas oil, furnace oil, diesel fuel, jet fuel, lubricating oil, etc. may advantageously be treated; straight run or cracked fractions may be treated. Also natural gas and refinery gas may be treated for removal of hydrogen sulfide and the alkaline material regenerated according to the invention.

Any suitable epoxide reagent can be used in the second step. Suitable reagents are those compounds having a three-member heterocyclic ring containing one oxygen atom and two carbon atoms. Preferred epoxide reagents for use according to the invention are those having the formula:

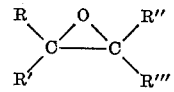

where R is selected from the group consisting of hydrogen, hydrocarbon radicals having 1 to 5 carbon atoms, halogen radicals, alkoxy alkyl or other hydrocarbyloxy alkyl radicals, and where R', R'' and R''' are each selected from the group consisting of hydrogen, hydrocarbon radicals having 1 to 5 carbon atoms, and halogen radicals. More preferably the hydrocarbon radicals have 1 to 3 carbon atoms. Examples of epoxides which can be used are ethylene oxide, propylene oxide, butylene oxide, styrene oxide, phenoxy propylene oxide, butoxy propylene oxide, epichlorohydrin, butadiene oxide, etc.

The regeneration process according to the invention is applicable to alkaline treating agents generally. Examples of alkaline treating agents for petroleum which can be regenerated according to the invention are alkali metal oxides, hydroxides, and carbonates, alkaline earth metal oxides, hydroxides, and carbonates, isopropanolamine, triethanolamine, etc.

Figure 2:
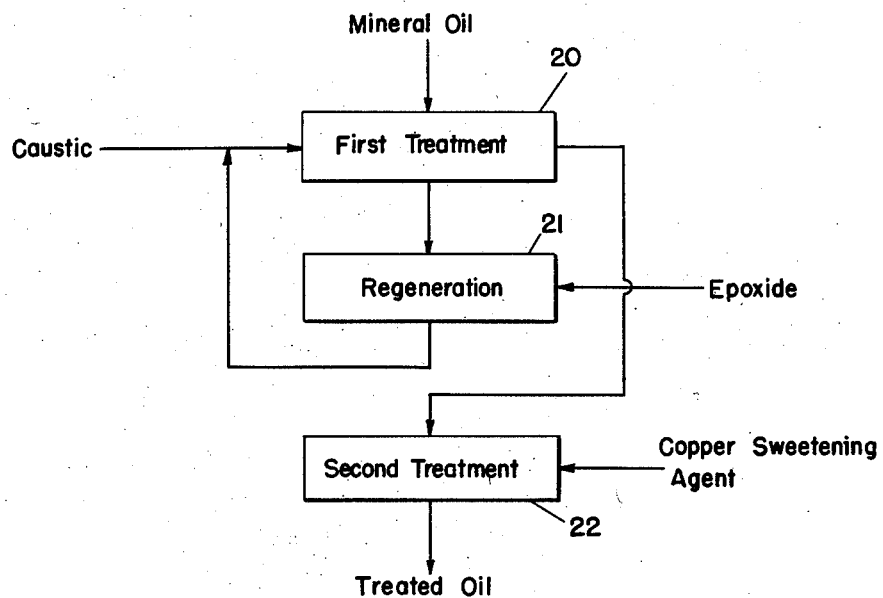

The invention will be further described with reference to the attached drawing, wherein Figure 1 illustrates regeneration of used caustic soda by treatment with an epoxide, and Figure 2 illustrates such regeneration as an element in a multiple stage treating process.

In the process of the drawing, mineral oil, e. g. gasoline, is treated with alkaline material, e. g. caustic soda, in zone 10 in the absence of an epoxide. This may be a conventional caustic soda treatment of the type well known in the art. Generally, the concentration of the caustic soda will be in the range from 5 to 25%, though higher or lower concentrations can be used. The amount of alkaline material employed is generally a minor amount, and is preferably in the range from 0.5 to 25 parts by weight of alkaline material per 100 parts of petroleum material, more preferably 5 to 20 parts per 100. All or part of the used caustic obtained on separation of layers is then contacted with an epoxide in zone 11. The amount of epoxide used may be determined on a stoichiometric basis, providing one mole of epoxide for each mole of sodium mercaptide in the caustic soda. Alternatively, a lesser or greater amount of epoxide can be used. Generally, the amount will be in the range from 0.001 to 10 parts by weight per 100 parts of mineral oil, more preferably 0.005 to 5 parts per 100. The temperature of the treatment in zone 11 may be ordinary temperature without heating, or higher or lower temperatures may be employed, e. g. 30–300° F. The regenerated caustic obtained from zone 11 contains thioethers and may also contain sodium mercaptides, phenolates or ethers, and naphthenates or esters, depending on the extent of reaction of epoxide with mercaptides, phenolates, and naphthenates. This regenerated caustic may be returned, entirely or in part, to zone 10 or some other treating zone to contact additional petroleum material.

Figure 2 illustrates a multiple stage operation wherein hydrogen sulfide is removed from a petroleum distillate in a first stage, and mercaptans are removed from the distillate in a second stage. In the process of Figure 2, mineral oil, e. g. gasoline, containing hydrogen sulfide and mercaptans is treated with caustic soda in zone 20, and all or part of the used caustic obtained on separation of layers is then regenerated in zone 21 by contact with an epoxide. The regeneration conditions are generally similar to those employed in the process of Figure 1 except that the amount of epoxide employed and the other conditions are such that sodium sulfide is converted to sodium hydroxide without converting any substantial amount of sodium mercaptide. The regenerated caustic is then re-used in zone 20 to contact additional gasoline. Because of the sodium mercaptide content of the regenerated caustic, the extent of removal of mercaptans from gasoline in the treatment with regenerated caustic is substantially less than that obtained with corresponding caustic not containing sodium mercaptides. However, the extent of removal of hydrogen sulfide by the regenerated caustic is not substantially less than that obtained with fresh caustic. As the caustic continues to circulate through zones 20 and 21, the sodium mercaptide content builds up until saturation concentration is reached, whereupon only hydrogen sulfide is removed from the gasoline in zone 20. The treated gasoline from zone 20 is introduced into zone 22 where it is contacted with a copper sweetening agent under conditions known for copper sweetening operations, in order to remove the mercaptans remaining in the gasoline after the zone 20 treatment. This operation is advantageous in that the hydrogen sulfide removed in the zone 20 treatment would have been highly detrimental in the copper sweetening treatment, and in that the caustic soda employed in the zone 20 treatment can be used for long periods of time without deterioration in its ability to remove hydrogen sulfide.

Any suitable sweetening method can be employed for removal of mercaptans in the second treatment. The indicated copper treatment, involving use of aqueous copper salts, e. g. copper sulfate or copper chloride, in the presence of an oxidizing gas, e. g. air or oxygen, is highly satisfactory. Other suitable treatments include contacting with an epoxide, preferably in the presence of an alkaline catalyst if the temperature is below 200° F., or contacting with an alkaline treating agent with regeneration by an epoxide according to the invention, etc.

The regeneration according to the invention can also advantageously be used in a process wherein an added solutizer is employed, e. g. methanol, alkali metal isobutyrate, diethylene glycol, etc. The present regeneration has advantages over the distillation or steam stripping which is commonly employed in the prior art solutizing processes.

The regeneration according to the invention can also be practiced in combination with other regenerative operations, e. g. treatment with lime to precipitate out carbon dioxide which the alkaline treating agent may contain.

In operation according to the invention, alkaline material which has been used to treat one type of petroleum fraction can be regenerated by contact with an epoxide and then used to treat another type of petroleum fraction. Thus, for example, a fraction obtained by catalytic cracking can be caustic treated, and the caustic regenerated and used to treat a straight run fraction. It has been found that such regenerated caustic is superior to fresh caustic for mercaptan removal. It is believed that this superiority is attributable to the presence in the regenerated caustic of phenolates and reaction products of epoxide with mercaptides and other materials which were extracted from the catalytic fraction by the caustic, or reaction products of such materials with epoxide.

It is also advantageous to treat a gaseous or liquid petroleum fraction containing $H_2S$ with caustic and regenerate the latter with an epoxide, preferably ethylene oxide in the case of a gaseous fraction such as petroleum refinery gases. The regenerated caustic is particularly suitable for treating gasoline fractions for mercaptan removal. It is believed that this suitability is attributable to diethanol sulfide formed by reaction of ethylene oxide with sodium sulfide during the regeneration.

The following examples illustrate the invention:

*Example I*

Straight run gasoline having copper number of 26.2 mg. of mercaptan sulfur (reactive with standard copper ammonium sulfate solution) per liter of gasoline was treated with 5 volume percent of caustic soda which had been previously used to treat other gasoline and had been regenerated by contact with ethylene oxide. The caustic was originally a 10% solution of sodium hydroxide in water. In the regeneration step, the caustic was stirred with 5 volume percent of ethylene oxide for 20 minutes at room temperature. The caustic was then blown with nitrogen to remove any excess ethylene oxide remaining.

The copper number of the gasoline was reduced to less than 2 by treatment with regenerated caustic as above described. By way of comparison, another sample of the same original gasoline was treated with 5 volume percent of the same used caustic which had not been regenerated by contact with ethylene oxide. The following table shows the results obtained:

| Gasoline | Copper No. |
|---|---|
| Original | 27.2. |
| Treated with regenerated used caustic | less than 2. |
| Treated with unregenerated used caustic | 17.5. |

These results show that excellent results can be obtained in refining gasoline with caustic soda regenerated with ethylene oxide.

Example II

The efficacy of epoxide treatment according to the invention in regenerating used caustic is demonstrated by the following data showing the sodium hydroxide, sodium sulfide, mercaptan and "weak base" content of used caustic before and after regeneration. The used caustic had been used previously to refine mineral oil and had the following contents of sodium hydroxide (strong base) and weak base:

Weight percent as NaOH
Sodium hydroxide _____ 10.0
Weak base _____ 3.0

These data were determined by dissolving about a 0.5 gram sample of the used caustic in 100 ml. of distilled water and titrating potentiometrically with aqueous standard hydrochloric acid employing a Beckman pH meter. A plot of pH as ordinate against ml. of standard HCl was obtained. The curve obtained, reading from left to right, had two portions in which the curve went more sharply downward after a less sharply downward trend; approximately the center of each such portion was taken as an "endpoint" on the abscissa. The amount of HCl used to reach the first endpoint was used to calculate the amount of strong base as NaOH, and the additional amount of HCl used to reach the second endpoint was used to calculate the amount of weak base as NaOH.

The used caustic was also found to have the following contents of sodium sulfide and sodium mercaptide:

Weight percent
Sodium sulfide _____ 1.0
Mercaptan _____ 3.1

These data were obtained by dissolving about 0.2 gram sample of used caustic in 95 ml. of ethanol and 5 ml. of water, making the solution about 0.1 normal in sodium acetate by addition of the latter, and about 0.15 normal in ammonium hydroxide by addition of the latter. A Beckman Model G pH meter having a silver electrode as indicator electrode and a glass electrode as reference electrode was used to make a potentiometric titration with 0.01 normal silver nitrate in 90 volumes of ethanol and 10 volumes of water. A plot of dial reading against ml. of silver nitrate was made. The curve obtained, reading from left to right, had three portions in which the curve went more sharply downward after a less sharply downward trend; approximately the center of each such portion was taken as an endpoint on the abscissa. The amount of silver nitrate used to reach the first endpoint was used to calculate the amount of sodium sulfide as $Na_2S$, and the additional amount of silver nitrate used to reach the third endpoint was used to calculate the amount of mercaptan as RSH assuming an average molecular weight of 100. The second endpoint, less pronounced than the others, is believed to be probably due to certain of the mercaptans, and the third endpoint due to the rest of the mercaptans.

The used caustic described above was contacted with 2.5 weight percent of ethylene oxide with agitation at ordinary temperature without heating for about 30 minutes. The following table shows the composition of the thus regenerated caustic as compared with the used caustic prior to regeneration:

| | Used Caustic, Percent | Regenerated Caustic, Percent |
|---|---|---|
| Sodium hydroxide | 10.0 | 10.5 |
| Weak base | 3.0 | 2.8 |
| Sodium sulfide | 1.0 | 0.1 |
| Mercaptan | 3.1 | 2.2 |

The figures for the regenerated caustic were corrected for a 2.5 percent increase in volume as a result of the regeneration. These results show that regeneration of used caustic with ethylene oxide is highly effective in reducing the sodium sulfide and sodium mercaptide content of the used caustic.

The reaction of sodium sulfide with ethylene oxide is probably the following:

The mercaptoethanol which is formed may further react with ethylene oxide as follows:

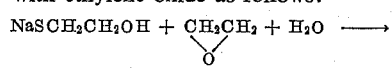

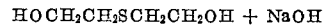

to form di (hydroxyethyl) sulfide. Any mercaptoethanol remaining in the regenerated caustic will act as a mercaptan in the above titration, and may be absorbed to an extent by mineral oil in subsequent re-use of the regenerated caustic. However, mercaptoethanol is not unduly objectionable in mineral oil; also, it is quite soluble in water and can therefore be washed out rather readily if desired. Di (hydroxyethyl) sulfide does not act as a mercaptan in the above titration.

In actual commercial operation, wherein gasoline containing $H_2S$ and mercaptans was treated with 10 percent caustic soda and the caustic soda regenerated by contact in a separate zone with an average of about 0.02 percent propylene oxide based on the gasoline, it was found that the sodium sulfide and sodium mercaptide content of the circulating caustic soda could be maintained at a level of less than 2000 mg. of reactive —HS groups per liter of caustic soda for a test period of three weeks, whereas under comparable conditions omitting the regeneration by propylene oxide, the sodium sulfide and sodium mercaptide content would reach a level of more than 20,000 mg. of reactive —HS groups per liter in a period of 10 days. During the operation involving regeneration with propylene oxide, the extent of removal of mercaptans and $H_2S$ from the gasoline was comparable to, and at times greater than, that obtainable with fresh caustic soda.

Example III

In this example, caustic soda which had been used to treat a catalytically cracked gasoline was regenerated with propylene oxide, and the regenerated caustic was employed to treat a straight run gasoline. The caustic soda, prior to regeneration, contained 20.0 weight percent of phenols as sodium phenolates. The regeneration was accomplished by contacting 0.2 part by volume of propylene oxide with 100 parts by volume of caustic soda at room temperature.

The straight run gasoline prior to treatment contained about 35 mg. of mercaptan sulfur per liter. The treatment was effected by contacting 100 parts by volume of the gasoline with 10 parts by volume of the regenerated caustic soda at room temperature. After the treatment the gasoline was found to contain about 2.9 mg. of mercaptan sulfur per liter, indicating about 91.8 percent removal of mercaptans.

By way of comparison, the same straight run gasoline was treated with the same caustic soda without regeneration, under the same treating conditions, and 71.4 percent of the mercaptans were removed. The following table shows a comparison of operations wherein caustic soda which has been used to treat catalytic gasoline is used to treat straight run gasoline, with and without intervening epoxide regeneration:

Percent RSH removal
Unregenerated ............................................ 71.4
Regenerated (treat No. 1) ........................... 91.8

In the case of the regenerated caustic employed to treat straight run gasoline, the caustic after the treatment was contacted with 0.035 part by volume of propylene oxide per 100 parts of caustic at room temperature. Then the caustic was employed again to treat additional portions of the same straight run gasoline. 98.2 percent of the mercaptans were removed.

Following this second treatment of straight run gasoline with regenerated caustic, the same caustic was used in eight additional treatments of portions of the same straight run gasoline, each treatment being preceded by regeneration with 0.01 part by volume of propylene oxide per 100 parts of caustic soda. During these additional treatments, the percent mercaptan removal gradually decreased. The following table illustrates the results obtained:

| Treat No. | Vol. Percent Epoxide | Percent RSH Removal |
|---|---|---|
| 1 | 0.2 | 91.8 |
| 2 | 0.035 | 98.2 |
| 5 | 0.01 | 89.0 |
| 6 | 0.01 | 87.3 |
| 10 | 0.01 | 69.7 |

Since the percent mercaptan removal decreases, after a time, with successive treats of straight run gasoline, it is advantageous, when this occurs, to use the caustic again to treat catalytic gasoline and regenerate with epoxide to build up again in the caustic the concentration of materials providing good mercaptan extraction from straight run gasoline.

The process of the invention may advantageously be applied to alkaline treating agents containing added solutizers, or solubilizing agents, tending to increase the solubility of mercaptans in the alkaline treating agent. Thus, the invention may be applied to treating agents containing hydroxyaliphatic solubilizers including alcohol solubilizers, e. g. methanol, ethanol, isopropanol, etc., polyhydroxy solubilizers, e. g. ethylene glycol, butylene glycol, triethylene glycol, glycerine, triethanolamine, etc. The invention may also be applied to treating agents containing phenolic solubilizers of the prior art type, e. g. cresols, xylenols, petroleum phenols, etc. The invention may also be applied to treating agents containing carboxylic solubilizers of the prior art type, e. g. potassium formate, sodium propionate, potassium isobutyrate, potassium caproate, potassium naphthenate, etc. The regeneration according to the invention avoids the disadvantageous volatilization of the solubilizing agent which occurs in the prior art regeneration by steaming as applied to volatile solubilizing agents. The regeneration according to the invention also avoids the necessity for supplying heat, as in the regeneration by steaming. In the case of solubilizing agents which are capable of reacting with epoxides, e. g. phenols, such reaction can be substantially avoided by restricting the amount of epoxide used to an amount such that the reaction with alkali metal sulfide and/or alkali metal mercaptide occurs to the substantial exclusion of reaction with phenolates. Generally, the reaction of phenolates is substantially avoided by use of an amount of epoxide not substantially greater than the stoichiometric amount required for reaction with the sulfide and mercaptide present.

In the process described in connection with the drawing, regenerated alkaline material containing thioethers and other organic materials was contacted with additional hydrocarbon material for removal of compounds, e. g. mercaptans, reactive with the alkaline material. Alternatively, such thioethers and other organic materials can, prior to such contacting, be removed at least in part from the regenerated alkaline material. This can be accomplished, for example, by intimately contacting the regenerated caustic with a hydrocarbon solvent which is substantially free of compounds reactive with the alkaline treating agent, in order to extract thioethers and other hydrocarbon-soluble materials if present, from the treating agent. The resulting treating agent may then be contacted with additional hydrocarbon material containing compounds which are reactive with the alkaline material. When this is done the product obtained from the latter contacting contains less thioether etc. than the product obtained as described in connection with Figure 1, and may accordingly have higher susceptibility to tetraethyl lead. The hydrocarbon solvent can be stripped from the extracted thioethers, etc., and re-used to contact additional regenerated caustic.

This application is a continuation-in-part of copending application Serial No. 425,477, filed April 26, 1954, by the instant inventors, and now abandoned.

The invention claimed is:

1. Method for regenerating an alkaline treating agent which has been used to treat mineral oil containing objectionable sulfur compounds which comprises: contacting said treating agent with an epoxy compound added subsequent to the treatment of mineral oil and having the formula:

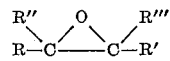

where R is selected from the group consisting of hydrogen, halogen radicals, hydrocarbon radicals having 1 to 5 carbon atoms, hydrocarbyloxyalkyl radicals, and

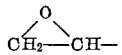

radicals, and where R', R'', and R''' are each selected from the group consisting of hydrogen, hydrocarbon radicals having 1 to 5 carbon atoms, and halogen radicals, the amount of said epoxy compound and the time of said contacting being sufficient to provide substantial conversion by the epoxy compound of reaction products of said sulfur compounds with constituents of said treating agent.

2. Method according to claim 1 wherein said compound is ethylene oxide.

3. Method according to claim 1 wherein said compound is propylene oxide.

4. Method for regenerating an alkaline treating agent which contains an added solubilizing agent selected from the group consisting of phenolic solubilizing agents, carboxylic solubilizing agents, and hydroxyaliphatic solubilizing agents, and which has been used to treat mineral oil containing objectionable sulfur compounds which comprises: contacting said treating agent with an epoxy compound added subsequent to the treatment of mineral oil and having the formula:

where R is selected from the group consisting of hydrogen, halogen radicals, hydrocarbon radicals having 1 to 5 carbon atoms, hydrocarbyloxyalkyl radicals, and

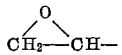

radicals, and where R', R'', and R''' are each selected from the group consisting of hydrogen, hydrocarbon radicals having 1 to 5 carbon atoms, and halogen radicals, the amount of said epoxy compound being insufficient to provide substantial reaction with said added solubilizing agent.

5. Method according to claim 4 wherein said solubilizing agent is methanol.

6. Method for refining petroleum which comprises: contacting petroleum hydrocarbons containing hydrogen sulfide with an alkaline treating agent, thereby to form alkali metal sulfide in said treating agent; subsequently contacting the treating agent with an added epoxy compound having the formula:

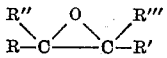

where R is selected from the group consisting of hydrogen, halogen radicals, hydrocarbon radicals having 1 to 5 carbon atoms, hydrocarbyloxyalkyl radicals, and

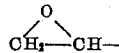

radicals, and where R', R", and R'" are each selected from the group consisting of hydrogen, hydrocarbon radicals having 1 to 5 carbon atoms, and halogen radicals, the amount of said epoxy compound and the time of contacting of the treating agent with the epoxy compound being sufficient to provide substantial conversion of said alkali metal sulfide by the epoxy compound, thereby to form a material selected from the group consisting of diethanol sulfide and derivatives thereof in said treating agent; and using the resulting treating agent to contact mercaptan-containing petroleum hydrocarbons in liquid phase.

7. Method for refining petroleum which comprises: contacting a cracked petroleum fraction with an alkaline treating agent; subsequently contacting the treating agent with an added epoxy compound having the formula:

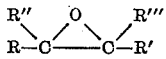

where R is selected from the group consisting of hydrogen, halogen radicals, hydrocarbon radicals having 1 to 5 carbon atoms, hydrocarbyloxyalkyl radicals, and

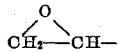

radicals, and where R', R" and R'" are each selected from the group consisting of hydrogen, hydrocarbon radicals having 1 to 5 carbon atoms, and halogen radicals; and using the resulting treating agent to contact a straight run petroleum fraction.

8. Method according to claim 1 wherein reaction products of said epoxy compound with constituents of said alkaline treating agent are extracted from the treating agent prior to re-use of the latter to treat mineral oil.

9. Method for refining petroleum which comprises: contacting petroleum hydrocarbons containing hydrogen sulfide and mercaptans with an alkaline treating agent, thereby to form alkali metal sulfide in said treating agent; subsequently contacting the treating agent with an added epoxy compound having the formula:

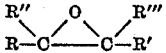

where R is selected from the group consisting of hydrogen, halogen radicals, hydrocarbon radicals having 1 to 5 carbon atoms, hydrocarbyloxyalkyl radicals, and

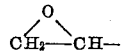

radicals, and where R', R" and R'" are each selected from the group consisting of hydrogen, hydrocarbon radicals having 1 to 5 carbon atoms, and halogen radicals, the amount of said epoxy compound and the time of contacting of the treating agent with the epoxy compound being sufficient to provide substantial conversion by the epoxy compound of said alkali metal sulfide; using the resulting treating agent to contact additional petroleum hydrocarbons containing hydrogen sulfide and mercaptans, thereby to convert primarily only hydrogen sulfide to the corresponding alkali metal compound, mercaptans being left in the hydrocarbons; and subsequently treating the hydrocarbons to remove mercaptans therefrom.

10. Method for refining petroleum which comprises: contacting petroleum hydrocarbons containing hydrogen sulfide with an alkaline treating agent, thereby to form alkali metal sulfide in said treating agent; and subsequently contacting the treating agent with an added epoxy compound having the formula

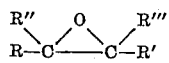

where R is selected from the group consisting of hydrogen, halogen radicals, hydrocarbon radicals having 1 to 5 carbon atoms, hydrocarbyloxyalkyl radicals, and

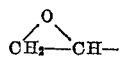

radicals, and where R', R" and R'" are each selected from the group consisting of hydrogen, hydrocarbon radicals having 1 to 5 carbon atoms, and halogen radicals, the amount of said epoxy compound and the time of contacting of the treating agent with the epoxy compound being sufficient to provide substantial conversion of said alkali metal sulfide by the epoxy compound.

11. Method according to claim 1 wherein said mineral oil, prior to treating with said alkaline treating agent, was treated for removal of hydrogen sulfide therefrom.

12. Method according to claim 1 wherein the time of said contacting is at least about 20 minutes.

References Cited in the file of this patent

UNITED STATES PATENTS

| 2,297,537 | Craig et al. | Sept. 29, 1942 |
| 2,413,945 | Bolt | Jan. 7, 1947 |
| 2,428,623 | Hewlett et al. | Oct. 7, 1947 |
| 2,468,701 | Cauley | Apr. 26, 1949 |
| 2,562,767 | Browder et al. | July 31, 1951 |
| 2,575,989 | Arundale et al. | Nov. 20, 1951 |